Oct. 29, 1968
B. WHITEHEAD
3,407,608
SUBSURFACE IRRIGATION SYSTEM
Filed Oct. 21, 1965
2 Sheets-Sheet 1
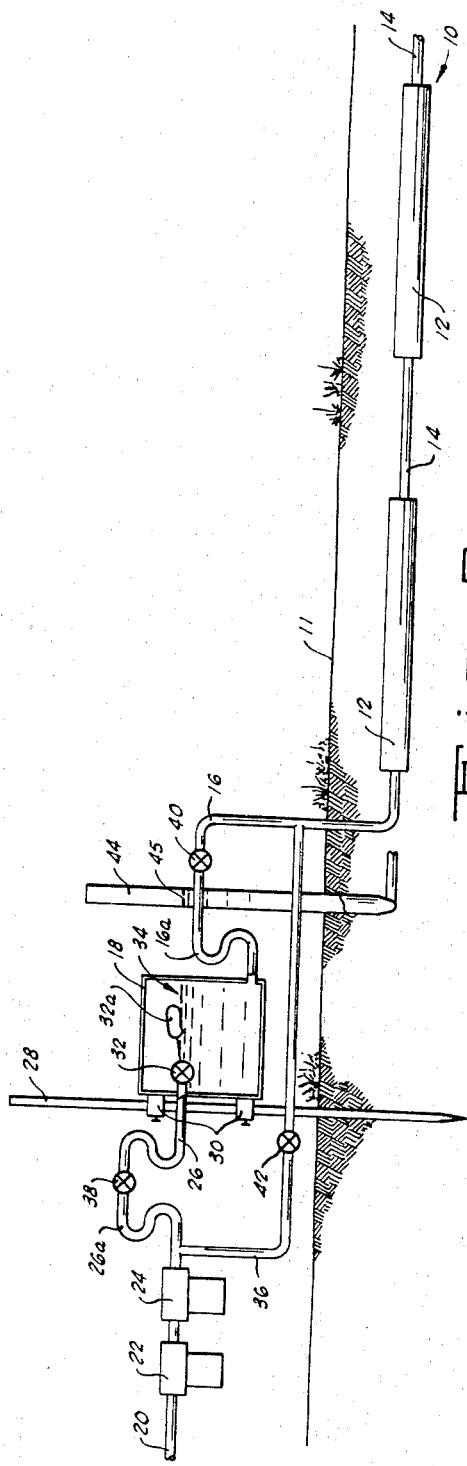
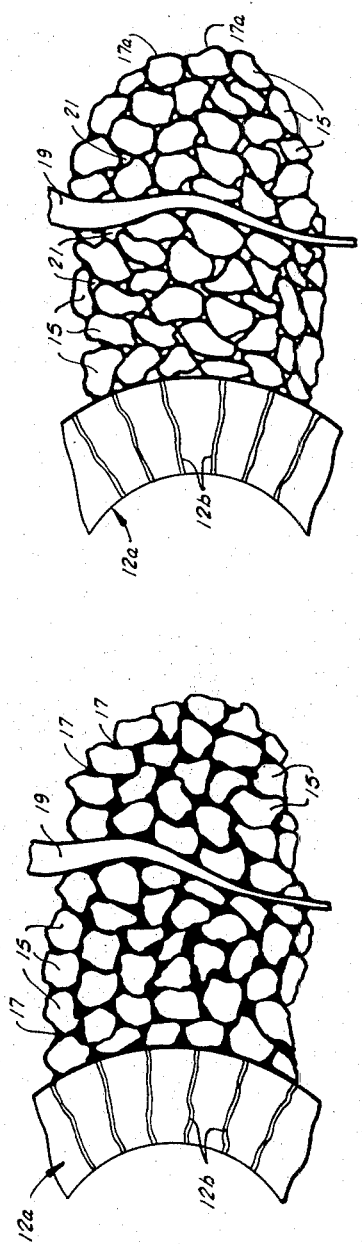
INVENTOR.
BROWNLOE WHITEHEAD
BY
Dunlap Laney & Hubbard
ATTORNEYS

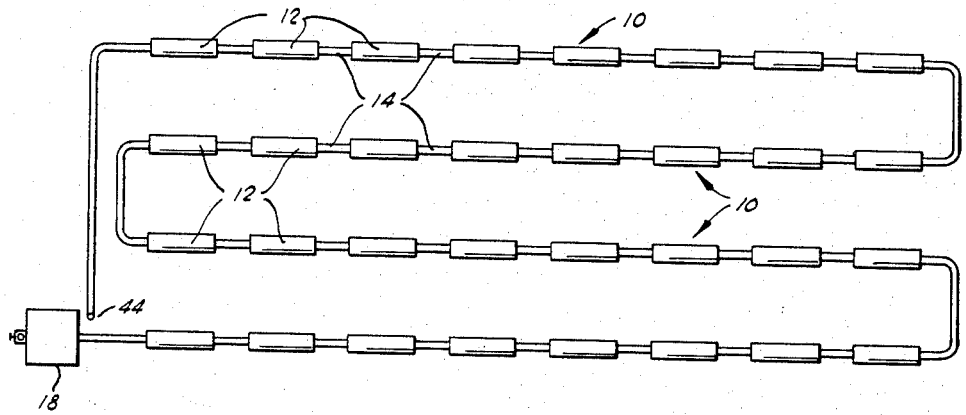
Fig. 3
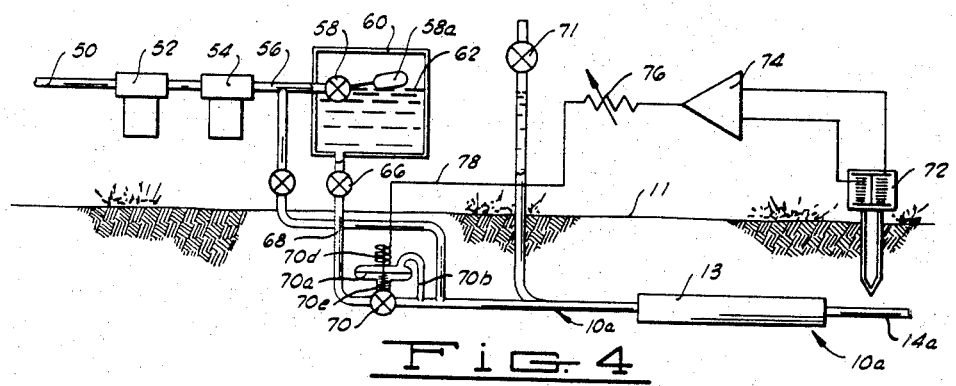
Fig. 4
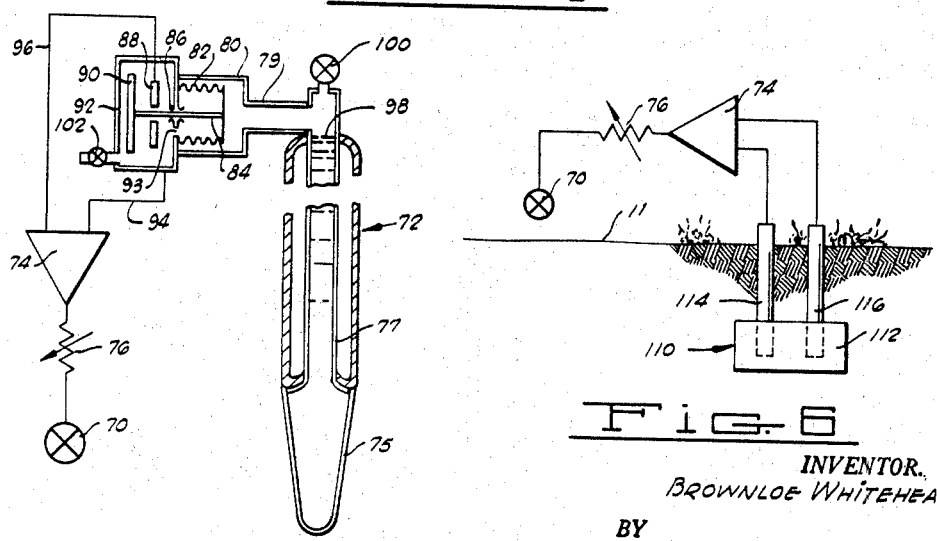
Fig. 5
Fig. 6

United States Patent Office 3,407,608
Patented Oct. 29, 1968

3,407,608
SUBSURFACE IRRIGATION SYSTEM
Brownloe Whitehead, 412 Hazlewood Drive,
Fort Worth, Tex. 76107
Continuation-in-part of application Ser. No. 103,359,
Apr. 17, 1961. This application Oct. 21, 1965, Ser.
No. 505,597
5 Claims. (Cl. 61—13)

This is a continuation-in-part of U.S. application Ser. No. 103,359 filed Apr. 17, 1961, entitled Subsurface Irrigation System, now abandoned.

The present invention relates to subsurface irrigation and more particularly, but not by way of limitation, relates to method and apparatus for applying moisture to soil at varying rates to continually control the moisture content of the soil.

In many parts of this country, particularly in the southwestern and western regions where natural rainfall is inadequate, artificial watering by irrigation is necessary for economical farming and for general landscaping around homes, buildings, golf courses and the like. Irrigation has become so extensive that the available water supplies of these regions have been taxed to the limit, and in some cases have been virtually exhausted. The need for better methods of irrigation has long been recognized, and considerable effort has been made to improve irrigation systems. However, the basic technique presently in use, that of flooding the surface with water, has been used for many centuries. This method requires a considerable supply of water, special tilling of the soil for each growing season, considerable manual labor and supervision during each flooding period, and usually results in wasted water through surface runoff and percolation below the roots due to saturation of the soil. Further, this flooding method frequently leaches soluble plant nutrients from the zone of maximum root concentration and creates conditions more favorable for either starting or agitating existing drainage problems due to salinity of the soil. Also, during the cycle between each flooding, the soil is too wet or too dry most of the time, with the very best soil moisture content for optimum plant growth lasting only for a day or two.

In more recent times, portable surface pipe and sprinkler systems have been used to spray water onto the soil. This type application has found extensive use for domestic lawns, golf courses and the like. However, these systems are undesirable because of the expense of the equipment, the labor required for operation, and because only a very small percent of moisture reaches the soil, the major part of the moisture being lost by evaporation and being blown away by wind. Also, the moisture content of the soil varies over a considerable range, from too dry to too wet.

Considerable effort has been made to perfect subterranean irrigation methods and systems, but no system has produced satisfactory results. Therefore, none of these systems have been used to any extent, in spite of the critical need for better irrigation methods.

In order to keep plants growing and fruiting properly, the available soil moisture must be maintained in ample quantities throughout the season, especially during the bloom, fruiting and maturing stages of growth, but the soil must not be flooded. The moisture content of the soil must be sufficiently great to permit the plants to take the water from the soil at the rate required for plant growth. Plants suffering from insufficient moisture will either die from lack of moisture or be stunted. On the other hand, too much water applied during the early stages of plant growth often retards growth. If the soil is kept too wet in the root zone of young plants, the resulting reduction of oxygen retards early plant growth. Excessive moisture also causes the soil to remain cold during the spring and makes the young plants more susceptible to seedling diseases. Excessive water during the latter stages of maturity, for many agricultural crops, may result in too much vegetative growth. Therefore, it is essential for "optimum" plant growth that an "optimum" amount of soil moisture be provided at all times in the zone of maximum root concentration.

The "optimum" amount of soil moisture varies for each type of plant being grown and for each particular soil. In other words, it may be necessary to maintain the soil moisture content in the same soil at a higher level for one type of plant than for another. As previously mentioned, the optimum soil moisture content also varies with the same plant, depending upon the stage of growth of the plant. Even for the same plant, the optimum amount of soil moisture varies greatly for each type of soil. Soils may even vary appreciably in moisture characteristics within the same cultivated field.

The primary consideration in irrigation is to supply the plants with moisture at a "rate" which is sufficient to maintain the proper or desired plant growth or plant condition. The plants should be able to withdraw water from the soil fast enough to offset losses by transpiration and that used for the desired normal plant growth. The moisture level required in a particular soil in order for plants to extract water at the desired rate depends greatly upon the depth and extensiveness of the root system, the stage of plant growth, the water storage properties of the soil, the rate at which the soil will release water to the roots at given tensions, the transpiration characteristics of the individual crops, and the many factors which influence evapo-transpiration losses.

In order to maintain the moisture content of a given unit volume of soil at some selected "optimum" value at which the plant can withdraw water at the desired "optimum" rate, the moisture must be added to that unit volume of soil at the same average rate at which moisture is lost from the unit volume of soil. Therefore, the moisture must be added at continually varying rates because the rate at which moisture is dissipated or lost from the soil continually varies.

Some moisture is lost from the soil by evaporation into the atmosphere. The rate at which moisture is lost by evaporation varies greatly with the atmospheric conditions, the wind, sun and humidity conditions being of major importance. Moisture is also pumped from the soil by the plants for normal plant growth. A considerable amount of moisture is pumped from the soil by the plant and into the atmosphere in the form of water vapor by the process known as transpiration. The transpiration rate varies greatly with various stages of plant growth and between daylight and darkness. Water can also be lost from the soil by percolating below the root zone as a result of the force of gravity. Generally speaking, gravity loss of the water is present only when the soil is in saturated condition so that the gravity can overcome the surface tension effect of the soil.

From the above, it will be evident that virtually an infinite number of factors and combinations of factors affect the rate at which moisture must be added to the soil in order to maintain the soil at some "optimum" moisture condition at which plants can extract the water at the "optimum" rate for "optimum" plant growth. The rate at which moisture must be added continually changes to some degree each day. Further, it is impossible under actual field conditions to determine in advance the moisture required to attain an "optimum" soil moisture condition for any particular plant or soil. Determination of the rate at which moisture should be added to the soil to obtain an "optimum" soil moisture condition can only be made on a trial and error basis for each plant, soil and climate combination.

Therefore, an important object of the present invention is to provide subsurface irrigation method and apparatus for continually maintaining the moisture content of the soil within any desired "optimum" range.

Another object of the present invention is to provide subsurface irrigation method and apparatus with which the horitculturist can adjust the moisture content of the soil as desired.

Another object of the present invention is to provide a method and apparatus of the type described which uses a minimum quantity of water.

Another object of the present invention is to provide a method and apparatus of the type described which requires a minimum of human supervision.

Another object of the present invention is to provide a method and apparatus of the type described which automatically maintains the moisture content at any desired level.

Another object of the present invention is to provide subsurface irrigation apparatus of the type described which gives a visual indication of the rate at which water is being supplied to the soil to facilitate adjustment of the system.

Another object of the present invention is to provide a device for automatically controlling the pressure of water in the distribution system responsive to the moisture content of the soil.

In accordance with the present invention, a subsurface irrigation method and apparatus is provided for continually applying water to the root zone of plants growing in the soil in such a manner that the moisture content of the soil can be continually maintained substantially at "optimum" conditions as desired for "optimum" or desired plant growth or productivity. In accordance with the present invention, a distribution conduit is buried in the soil. The distribution conduit has water permeable walls with a fixed, relatively high resistance to flow of water through the walls. A supply of water at some selectable pressure is continually maintained in the distribution conduit. The pressure of the water is selected such that the combination of the positive pressure in the conduit and the negative pressure in the soil caused by capillary attraction causes the water to continually flow through the walls at the same rate, averaged from day to day, that the moisture is lost from the soil.

In accordance with a more specific aspect of the invention, a conduit is buried in the soil having permeable walls with a sufficiently high resistance to flow of water therethrough that for a given pressure range within the conduit the rates of flow through the conduit walls will not exceed the rates of moisture loss from the soil for a given range of moisture loss conditions, and a variable pressure regulator means is connected to continually supply water at a preselected pressure to the conduit.

In a specific embodiment of the invention, a water container is connected to supply water under pressure to one end of the conduit so that the pressure in the conduit adjacent said one end is determined by the water level in the container with respect to the conduit. A water supply is connected to fill the container by a suitable valve means for maintaining a preselectable water level in the container so that the pressure in the conduit can be preselected by preselecting the level of the water in the container.

In accordance with a more specific aspect of the invention, an open-end standpipe is connected to the other end of the conduit for indicating, by the level of water in the standpipe, the water pressure at the end of the conduit. The water levels at each end of the conduit can then be compared to facilitate adjustment of the pressure within the conduit to the optimum level.

Additional objects and advantages will be evident from the following detailed description and drawings wherein:

FIGURES 1A and 1B are schematic illustrations of soil structure adjacent a permeable wall of a distribution conduit in accordance with the present invention;

FIGURE 2 is a schematic elevational view of one embodiment of the present invention;

FIGURE 3 is a schematic plan view of the embodiment shown in FIGURE 2;

FIGURE 4 is a schematic illustration of another embodiment of the present invention;

FIGURE 5 is an enlarged schematic illustration of the sensing element of the device of FIGURE 4; and FIGURE 6 is a schematic illustration of another type sensing element whch may be substituted for the device shown in FIGURE 5 and used in combination with the embodiment shown in FIGURE 4.

Referring now to the drawings, a distribution conduit 10 is buried in the soil at a depth best suited to supply water to the root zone of the particular plants growing in the soil. The conduit 10 may be routed back and forth as shown in the schematic plan view of FIGURE 3, preferably at the same elevation to provide uniform pressure within the conduit 10. The distribution conduit 10 has at least one section of water permeable walls having some fixed physical structure with some relatively fixed resistance to flow of water through the walls. For example, the conduit 10 may conveniently be constructed from a plurality of pervious ceramic tile elements 12 interconnected by flexible plastic, non-pervious lengths of tubing 14. As is hereafter described in detail, the distribution conduit 10 is filled with water at some pressure which is to be adjusted in accordance with the present invention.

Referring now to FIGURES 1A and 1B, the pervious wall of one of the elements 12 is represented at 12a and the pervious characteristic of the element wall 12a is represented by the flow channels 12b. The element wall 12a is buried in soil having particles 15, the particles 15 being shown in exaggerated size. A root 19 of a plant is shown growing in the soil particles 15.

In FIGURES 1A, the moisture content of the soil is such that the pores spaces between the soil particles 15 are completely filled with water, as represented by the solid black areas 17, and the soil is said to be saturated. Most plants cannot live in this environment because of a lack of air. In FIGURE 1B, each soil particle is encased in a relatively thick film of water 17a, but each of the pore spaces also has a pocket of air 21 which permits the plant root 19 to take air, in addition to water, from the soil and the plant can survive.

Whenever the soil is less than saturated, as in FIGURE 1B, the surface tension of the water film 17a around each soil particle exerts an attractive force on the water in the adjacent pore spaces, which results in a so-called suction or negative pressure in the soil. The thinner the film of water 17a around the soil particles 15, the greater the tension with which the water is held to the soil particles, the greater the force exerted on the water in the adjacent pore spaces, and the greater the suction or negative pressure. As the moisture content of the soil increases, the water film 17a around each of the particles 15 increases in thickness, and the surface tension decreases, with a corresponding decrease in the suction or negative pressure of the soil. Greater surface tensions in drier soil zones will tend to draw water away from the wet zones so that water will be transported through the soil by a process known as capillary attraction or, when referring to soils, capillary conduction.

Plant roots extract water from the soil by substantially the same capillary process. As the soil becomes dry and the moisture tensions in the soil increase, the thin moisture films are held to the soil particles with greater force and the ease with which the plants can take moisture from the soil decreases. The rate at which the plants take water from the soil is therefore dependent upon the soil suction pressure or surface tension adjacent the roots of the plants. At some soil moisture content between dry and saturated, the surface tension is low enough to permit the plants to extract water from the soil at the best rate for maintaining the desired plant growth. Exactly what moisture content and resulting tension must exist in the soil before the plant can extract the water from the soil at the desired rate varies greatly with the type of soil, the type of plant being grown, the extensiveness of the root system of the plant and, most important of all, the rate of plant growth desired. It is the purpose of this invention to provide a method and apparatus for controlling the soil moisture content until the best or "optimum" condition is found which, in the judgment of a horitculturist, results in the plants taking the water from the soil at a rates which produces the desired or "optimum" growth or fruiting of the particular plant.

In order to continuously force a supply of water through the interior of the conduit 10, a positive pressure must always exist within the conduit, even if due only to the few inches of waterhead standing within the conduit 10. As previously mentioned, under all but saturated conditions, the pressure in the soil is negative or is a suction due to the surface tension of the moisture films 17a around the soil particles 15. Therefore, at almost any time the pressure within the conduit 10 must be greater than the suction pressure of the moisture in the soil so that a pressure differential exists across the conduit wall 12a. Whenever there is a pressure differential across the conduit wall 12a, water must flow through the pervious conduit wall 12a at a flow rate dependent upon the resistance of the wall 12a to the flow of water, and the magnitude of the pressure differential between the negative pressure in the soil and the pressure in the conduit.

The greater the pressure differential between the water in the conduit and the water in the soil, the greater the flow rate through the conduit wall 12a. The greater the resistance to flow of water through the conduit walls, the smaller the flow rate through the membrane walls at equivalent pressure differentials. If the pressure within the conduit 10 is too great and/or the resistance of the element walls 12a is too small or low, the flow rate through the walls may become greater than the rate at which the soil can transport the water by capillary conduction, or greater than the rate at which water is lost from the soil due to evaporation, transpiration and gravity. Under these latter conditions, the soil may become flooded. If, on the other hand, the pressure within the conduit is too low or the resistance of the element walls 12a is too high, the rate of flow through the walls 12a will not be sufficient to replenish the moisture supply in the soil as the moisture is pumped from the soil by the plants and lost from the soil by evaporation and gravity. In this case, the soil may become too dry.

The present invention is based on the fact that a relatively small decrease in the moisture content of the soil will produce a relatively large increase in negative pressure and any drying of the soil will produce a substantial increase in the flow rate through the element walls 12a to compensate for the increased moisture dissipation rate from the soil necessary to cause the soil to dry. For example, assume that at some pressure within the conduit 10 there is a flow rate through the walls 12a which will maintain a certain soil moisture content, from day to day, so long as the average atmospheric and plant growth conditions remain stabilized.

If the rate of water dissipation from the soil increases for any reason, the soil will begin to dry out slightly and the moisture content of the soil will decrease. The decrease in soil moisture content will produce a substantial increase in the moisture tension in the soil and thereby substantially increase the suction or negative pressure of the soil. The increased pressure differential across the wall of the conduit will in turn increase the water flow rate through the element walls 12a so that an equilibrium condition will be reestablished. In order to maintain the increased flow rate to the soil, the suction or negative pressure of the soil must be maintained at the increased value in order to maintain the higher pressure differential across the conduit wall 12a. Therefore, the soil must remain slightly drier than originally in order to maintain the higher suction or negative pressure required for the higher flow rate and equilibrium, but only a slight decrease in moisture content is required in order to produce a substantial increase in the flow rate through the wall of the conduit. On the other hand, when the soil becomes too wet as a result of a decreased rate of moisture dissipation from the soil, the soil suction decreases, the pressure differential decreases, and the flow rate decreases until equilibrium is reached. At the new equilibrium condition the soil remains slightly wetter than originally, but again only a slight change in the moisture content produces a substantial change in the rate of flow through the conduit walls sufficient to establish an equilibrium condition.

The average rate at which moisture must be added to a given volume of soil for a given period of time must equal the average total rate of moisture dissipation from the volume of soil for the same period of time in order to maintain a constant average moisture content. For example, assume that the pressure within the distribution conduit 10 is six inches of waterhead. During daylight hours, the plants become more active and extract water from the soil at a relatively high rate, and the temperature and wind velocities also tend to increase so that the moisture content of the soil will tend to decrease because of the increased rate of dissipation from the soil. Then when the sun sets, the rate of moisture dissipation from the soil will usually decrease substantially. Thus although the soil may tend to dry slightly during the day as the rate of loss increases, it will become more wet during the night as the rate of loss decreases so that any average moisture condition will persist for as long as the average atmospheric conditions exist. The average moisture content can be controlled by adjusting the pressure in the conduit, the pressure being increased to increase the average moisture content of the soil and being decreased to decrease the average moisture content of the soil.

The frequency with which the pressure must be adjusted depends upon the accuracy with which it is desired to maintain the precise "optimum" moisture content. For example, it may be desired to monitor or check the soil moisture content once each day, once each week, or once each month. In this connection, assume that after the distribution conduit is installed and filled with water, a pressure is found by trial and error adjustment that will maintain the desired "optimum" soil moisture content for given external conditions. Upon checking the moisture content after one week, the soil is found to be too dry. It must be assumed that the average rate of dissipation from the soil for the last week has increased. If it is also assumed that the external conditions which caused the increased rate of dissipation will continue to exist, then the pressure in the conduit should be increased to provide an increased average rate of flow from the conduit to the soil during the next week. When checking the soil after another week, if the soil is too wet, the pressure was too high and the average rate of flow from the conduit exceeded the average rate of dissipation from the soil. Therefore, the pressure should be decreased. However, if the soil is still too dry, the pressure should be increased still more.

The apparatus illustrated schematically in FIGURES 2 and 3 provides a means by which a horticulturist can control the water pressure in the distribution conduit 10 and, therefore, the soil moisture content of the soil by the method previously described. The apparatus is operational in any type soil and under most operating conditions. As previously described, a distribution conduit 10 has a plurality of pervious walled elements 12 which are interconnected by a plurality of non-pervious walled elements 14. The distribution conduit 10 is disposed below the surface of the soil 11 at some convenient depth, depending upon the plants being grown. The conduit 10 is preferably disposed just below the root depth of the plants or below plow depth when a cultivated crop is being grown. The distribution conduit 10 may be routed back and forth as shown in the plan schematic of FIGURE 3. The spacing between the elements 12 will depend on the ability of the particular soil to transport the water laterally. In general, the elements can be placed as close together as desired, economic considerations being the only limiting factor, but most not be spaced so far apart as to exceed the distance which the soil can transport the moisture.

The upstream end of the conduit 10 is connected by a flexible conduit 16 to a control receptacle 18. The flexible conduit 16 is long enough to permit the control receptable 18 to be moved relative to the surface of the soil, the added length being represented by a loop 16a. A continuous, unlimited source of water is connected to an inlet conduit 20 which is connected to a filter 22 and then to a fertilizer diffuser 24, if desired. Another flexible length of conduit 26 connects the source of supply to the control receptacle 18. The flexible conduit 26 also has sufficient length in the form of a loop 26a to permit the control receptacle 18 to be raised and lowered.

The introduction of water from the continuous supply to the control receptacle 18 is controlled by a float valve 32. The float valve 32 is opened and closed by the float 32a to maintain the depth of water standing in the control receptacle 18 at a constant level 34 relative to the receptacle 18.

A bypass line 36 is connected to the flexible line 26 at one end and to the flexible line 16 at the other end to provide a means for routing water directly from the supply around the control box 18 to the distribution conduit 10. Valves 38 and 40 are provided on the upstream and downstream sides of the control receptacle 18 to prevent flooding of the receptacle when using the bypass conduit 36. A valve 42 is provided in the bypass 36 to close the bypass during normal operation. The bypass 36 may be used to flush the distribution conduit 10 to remove any clogging material therein.

The other end of the distribution conduit 10 terminates in a vertical vent pipe 44. The vent pipe 44 is preferably disposed adjacent the control receptacle 18 and extends to a height above the highest level anticipated for the control receptacle 18. The vent pipe 44 is preferably a transparent plastic material to provide a sight glass for indicating the level of the water standing therein to permit a ready comparison between the level of the water 34 in the receptacle 18 and, if desired, the vent pipe 44 can be mounted on the receptacle 18 with a sufficient length of flexible tubing to permit the receptacle 18 to be raised to the highest desired level.

The pervious walled elements 12 may conveniently take the form of a ceramic tile tube having minute flow paths therethrough. The exact resistance of the walls 12a to flow therethrough can vary substantially and the resistance required depends primarily upon the range of suction pressures of the soil in which the conduit 10 is embedded, the range of pressures anticipated to be used within the conduit, and the range of rates at which moisture is expected to be dissipated from the soil.

Tests made on a sample from ceramic tile or clay elements 12 which have been successfully used show that the pervious elements had a porosity of 66.0 percent of bulk volume. The permeability of the sample to both air and to tap water was 134 millidarcys. In measuring the permeability value, flow rates were determined at six inches, twelve inches, and twenty-four inches of water-head. Flow rates with this pressure through a cross-sectional area of 1.62 centimeters were 0.00176, 0.00364 and 0.00709 cc.'s per second, respectively. The test sample through which these flows were taken had an average length of 1.94 centimeters. Based this data, flow rates of 0.00012, 0.00023 and 0.00045 gallons per minute per square inch of conduit wall would be expected for the three different pressure heads, respectively. Also, using the mercury injection method of determining pore size, the pore entry ratio was 0.079 microns, the maximum pore size was 5.0 microns, and the average pore size was 3.9 microns. Of course, the pore size and porosity are by no means definitive of the permeability or of the resistance to flow, but do aid in showing the physical nature of the element.

When placing the irrigation apparatus of FIGURES 2 and 3 in operation, the control receptacle 18 is preferably raised as high as possible on the stake 28 and clamped in place. With the bypass valve 42 closed, valves 38 and 40 are opened and water is introduced to the control receptacle 18. The float-controlled valve 32 will prevent the water from exceeding the level 34 and will maintain the water at the predetermined level 34 within the control receptacle 18. Water will then pass from the control receptacle 18 through the flexible conduit 16 into the distribution conduit 10. Assuming that the soil is relatively dry, the pressure differential between the pressure inside the conduit 10 and the soil will be large and the flow rate through the permeable walls 12a of the elements 12 will be relatively high. Until the soil becomes wet, substantially all of the water introduced into the distribution conduit 10 will pass outwardly through the elements 12 into the soil and no water will be visible in the return vent sight glass 44. After a day or so when the soil has become substantially wetted, the level of the water 45 in the vent 44 will approach the water level 34 in the control box 18. This condition indicates that the soil is moist because the flow rate through the conduit walls 12a has decreased to a point that the pressure drop through the conduit 10 to the vent 44 is very small for the particular flow rate through the element walls 12a. The control receptacle 18 is then progressively lowered on a trial and error basis until the lowest point is found at which the soil moisture is maintained at the desired level.

The vent sight glass 44 provides an excellent visual indication of the rate of flow through the element walls 12a. As the rate of flow through the walls increases, the pressure drop, as the result of friction, increases between the control receptacle 18 and the vent 44. The pressure drop is therefore reflected in the difference between the level 34 of the water in the receptacle and the level 45 of the water in the vent sight glass. Therefore, the difference between the two water levels 34 and 45 is an indication of the rate of flow from the distribution conduit 10 to the soil. After the pressure in the conduit has been adjusted by lowering the control receptacle as much as possible, the two levels should be almost the same. Then a further drop in the sight glass level 45 indicates that the flow rate from the conduit has increased, which must be caused by the soil becoming drier. Usually the control receptacle should be raised until the water level 45 approaches the water level 34, which indicates that the added pressure caused a greater flow rate through the element walls 12a until the soil became wetter.

The irrigation apparatus of FIGURES 2 and 3, with the permeable elements 12 having the tested properties previously described, can be installed in most types of soils. The resistance of the previous walls 12a to water flow therethrough may vary considerably. However, the resistance of the walls 12a must be sufficiently great that when the pressure in the conduit is reduced to the minimum pressure necessary to transport the water throughout the conduit, and when the soil is wetter than desired, the average rate of flow through the walls 12a must not exceed the minimum average rate of moisture loss from the soil. In other words, if the average rate of flow through the conduit walls is greater than the average rate at which moisture is lost from the soil when the soil is already too wet, the soil will be made even wetter and will not have a chance to dry out until the rate of moisture loss from the soil increases. Under these conditions, the moisture content of the soil could not be controlled by adjusting the pressure in the conduit 10.

At the other extreme, the resistance of the conduit wall 12a to flow of water therethrough must not be so great as to require a conduit pressure in excess of the maximum pressure available to the conduit in order to establish the highest average flow rate through the conduit required to offset the highest average rate of moisture loss from the soil. In this case, under conditions of maximum rates of moisture loss from the soil, the soil could not be prevented from becoming too dry. The resistance of the elements 12a to flow of water therethrough can therefore have a substantial range of values and still operate in any particular soil by adjusting the pressure within the conduit. But, for best operational results of the apparatus of FIGURES 2 and 3, the resistance of the pervious elements 12 should approach, as closely as possible, the lower resistance for the particular soil.

If the resistance of the pervious wall 12a is made as low as possible without being too low as defined above, a relatively low pressure differential across the conduit wall 12a will result in a high flow rate through the conduit walls 12a. Therefore, a slight increase in the negative pressure within the soil as a result of the soil drying out will cause a substantial increase in the rate of flow through the conduit walls 12a and will usually quickly equalize the increased rate of moisture loss from the soil. Therefore, a wider range of rates of moisture loss from the soil can be equalized with a minimum variation of the moisture content of the soil. In other words, assuming that a relatively low conduit pressure has been found by trial and error which results in the desired moisture content of the soil under certain atmospheric and plant growth conditions, then when the atmospheric or plant growth conditions change and cause a greater rate of moisture loss from the soil, the soil will become slightly drier and the soil suction will increase slightly. However, if the pressure in the conduit is low, the slight increase in suction results in a proportionately great increase in the pressure differential and the rate of flow through the conduit walls 12a will increase rapidly until it equals the rate at which moisture is being lost from the soil and a new equilibrium condition is established. However, the soil moisture content will have decreased only a small amount in order to provide the slight increase in negative pressure. Therefore, if the resistance of the conduit walls 12a is closely matched on the particular soil, the range of moisture loss rates from the soil can vary widely without a very large variation in the moisture content of the soil at a given pressure within the conduit 10.

On the other hand, if the resistance of the conduit walls 12a is too high, a high pressure must be established within the conduit 10 to provide the necessary flow rate from the conduit for equilibrium conditions under average external conditions. (atmospheric, etc.) and, therefore, average rate of loss from the soil. When the soil moisture then decreases and the suction pressure increases, the rate of flow through the conduit walls 12a will not increase as fast as when the resistance of the walls 12a was low, because the magnitude of the soil suction pressure is small compared with the high presure in the conduit and therefore will not change the pressure differential to a great extent. Therefore, the soil must become drier and the suction pressure increase much further to offset the same rate of loss from the soil, and in many cases the soil cannot create enough suction pressure to provide the necessary flow rate. In this case, the pressure in the conduit 10 must be adjusted to offset the increased flow rate. Therefore, it will be seen that the range of dissipation rates from the soil which can be offset by a given range of suction pressures is reduced as the pressure in the conduit is increased. Therefore, the pressure within the conduit must be adjusted each time the change in the rate of dissipation from the soil exceeds the capacity of the soil suction to compensate in order to maintain a desired range of soil moisture conditions.

As a practical matter, it cannot be calculated in advance just what resistance of the conduit walls 12a is required to match a particular soil. Nor can it be readily determined what range of moisture conditions are to be required in the soil or what range of moisture dissipation rates from the soil will be encountered. Therefor, it is impossible to exactly "match" the resistance of the elements 12 to the particular soil and flow rates in advance so that the resistance will be as small as possible. The only practical solution is to select one or more standard elements 12 having standard resistance to approximately match the element to various types of soil, and to adjust the pressure as necessary to maintain the moisture content of the soil within a desired range under varying atmospheric and plant growth conditions.

In the operation of the device of FIGURES 2 and 3, the frequency with which the pressure must be adjusted by raising and lowering the control receptacle 18 depends upon how well the resistance of the pervious elements 12 is matched to the soil, the accuracy with which it is desired to maintain the moisture content within certain limits, the range between the driest limit and the wettest limit to be permitted in the soil, the moisture-storing properties of the soil, the rate at which the soil will dry out, and the range of rates at which moisture will be lost from the soil due to changes in atmospheric and plant growth conditions.

For example, assume that after the soil becomes moist, the pressure in the conduit 10 is reduced by lowering the control receptacle 18 as far as possible until a desired moisture content is established. During the day the soil may become slightly drier due to the increased rate of loss from the soil, and during the night the soil will become wetter so that the average moisture content of the soil may remain within the desired range for the twenty-four hour period. However, suppose the weather becomes hotter, drier, and more windy and the average rate of loss from the soil increases substantially. When after a few days the soil becomes too dry, it is obvious that for the period of time since the last pressure adjustment the average flow rate to the soil was less than the average flow rate from the soil. In all probability, as the soil became drier and the increased suction pressure in the soil increased the rate of flow from the distribution conduit into the soil, the rates of flow to and from the soil equalized and the moisture content was stabilized. But, at the new stabilized condition the soil may be too dry. So long as the increased rate of loss from the soil exists, and it usually must be assumed that the new condition will continue to exist, the only way the average soil moisture content can be increased to the original desired level is to increase the pressure in the conduit. Therefore, if the soil becomes too dry after a few days' time, the control receptacle is raised to increase the pressure in the conduit.

When irrigating some plants, such as grass lawns and the like, the moisture content of the soil can be permitted to vary considerably without adversely affecting the appearance of the grass, which is the primary consideration. In such a case, the weather and plant growth conditions may change considerably, but so long as the upper and lower permissible moisture limits are not exceeded, it will be unnecessary to readjust the pressure in the distribution conduit 10. However, in the case of golf courses it may be desirable to maintain a high moisture content to promote a high rate of growth to more quickly repair damage to the grass due to divots and trampling, and it may be necessary to adjust the water pressure in the conduit 10 more often. Therefore, the permissible range of moisture levels which can be tolerated for the desired results has a direct bearing on how often the moisture content must be monitored and the pressure adjusted. In most applications an adjustment is required only when the climate conditions change considerably, such as from winter to summer and back to winter.

In the event it may be desirable to very precisely maintain the moisture content of the soil at a selected level, as for some commercial crops where it is desired to limit vegetative growth for best quality and quantity yields, or where it is desired to maintain moisture conditions in the soil surrounding and supporting the foundation of a building to prevent settling of the foundation, it may be desirable to use the apparatus illustrated in FIGURES 4, 5 and 6. Referring now to FIGURE 4, a distribution conduit 10a corresponds generally to the distribution conduit 10 of the device of FIGURES 2 and 3 and is comprised of water pervious elements 13 interconnected by non-pervious flexible tubing elements 14a. The distribution conduit 10a is disposed in the soil in the same manner as the conduit 10 and may have any suitable plan layout, such as that shown in FIGURE 3. Water is supplied to the conduit from an unlimited supply through a conduit 50. The water is preferably routed through a filter 52 and a fertilizer diffuser 54. The water supply then passes through a conduit 56 and through a float-controlled valve 58 into a reservoir 60. The water in the reservoir is preferably maintained at a constant level 62 by the float 58a of the valve 58 to provide a constant pressure head on the upstream side of a pressure regulator 70, hereafter described in detail.

Water then passes from the reservoir 60 through a valve 66, a conduit 68 and a pressure regulator 70 into the distribution conduit 10a. The pressure regulator controls the water pressure within the conduit 10a and may be of any suitable type which will maintain a constant pressure, for a particular setting, downstream of the device without regard to the flow velocity through the regulator. The pressure regulator 70 is also variable or adjustable by some electrical servo-mechanism so that the pressure within the conduit can be increased or decreased by the application of an electrical signal to the regulator device. This type device is well known in the art and therefore is not described in detail. In this system a valve 71 may be provided in the vent line so that the pressure in conduit 10a can be increased as high as desired.

The pressure regulator 70 is adjusted in accordance with the moisture content of the soil by an electrical servo system having a sensing element 72 disposed in a representative spot in the soil being irrigated, such as in the root zone of the plants. The sensing element 72 puts out an electrical signal in proportion to the moisture content of the adjacent soil. The electrical signal from the sensing element 72 is amplified by an amplifier 74. The amplified signal may then pass through a variable resistor 76 or other suitable means for controlling the magnitude of the signal and calibrating the signal to a pressure in the conduit and a soil moisture content as hereafter described. The amplified and controlled signal is then fed by the conductor 78 to the electrically adjustable pressure regulator 70 to control the pressure in the conduit in accordance with the moisture content of the soil being irrigated. The electrical adjustment operates to increase the pressure in the conduit 10a as the moisture content of the soil decreases and to decrease the pressure in the conduit 10a as the moisture content of the soil increases.

The moisture sensing element 72 may take the form of the device shown schematically in FIGURE 5. A porous and permeable ceramic cup 75 is in sealed fluid communication with a glass tube 77. The glass tube 77 is in sealed fluid communication with a suitable conduit 79 and a chamber 80. A diaphragm or bellows 82 is located in the chamber 80 and is connected to move a rod 84 passing through a suitable bushing 86. The rod 84 passes through an aperture in one plate 88 of a capacitor. Both plates 88 and 90 are located within a suitable housing 92. The plate 88 is fixed in position within the housing 92 and is electrically insulated from the other plate 90 and from the housing 92. The capacitor is placed in an electrical circuit by a suitable conductor 94 which is electrically connected to the housing 92 and therefore to plate 90 through the bellows 82 and rod 84, and by a conductor 96 which is connected directly to the insulated capacitor plate 88.

To place the sensing device 72 in operation, the pervious cup 75 and glass tube 77 are filled with water to a level 98 through a suitable valve 100. The valve 100 is then closed to seal the composite chamber formed by the cup 75, glass tube 77, conduit 79 and chamber 80 from the atmosphere. Of course, the pressure in the composite chamber is atmospheric at this time. The housing 92 is also airtight and in communication with the interior of the bellows 82 by the passage 93. The pressure within the housing 92 and the bellows 82 is then equalized with the atmospheric pressure and sealed by the valve 102. After the two pressures within the device are both equalized with the atmospheric pressure and sealed, the water within the pervious cup 75 will be drawn from the cup by the suction force of the soil surrounding the cup. The water will be withdrawn until the suction or negative pressure within the glass tube 77 and chamber 80 is equal to the suction pressure within the surrounding soil. The reduced pressure within the chamber 80, as compared with the atmospheric pressure in the housing 92, causes the bellows 82 to expand which moves the capacitor plate 90 closer to the capacitor plate 88.

The pressure within the glass tube 77 and the chamber 80 will remain in equilibrium with the suction pressure of the surrounding soil. As the moisture content of the soil decreases and the soil suction increases, more water will be withdrawn from the pervious cup 75 and the pressure within the device will be further decreased, the bellows 82 will expand further and the capacitor plates 88 and 90 will be moved closer together. As the spacing between the capacitor plates decreases, the electric signal through the conductors 94 and 96 is increased. The increased signal is detected and amplified by the amplifier 74 and the amplified output is fed to the pressure regulator 70 and acts to increase the magnitude of the regulated pressure within the conduit 10a.

The increased pressure within the conduit 10a increases the flow rate through the pervious walls of the elements 13 and the soil becomes wetter. As the soil becomes wetter and the suction pressure decreases, the suction or pressure below atmospheric within the sensing device 72 draws water from the soil into the pervious cup 75. The increased pressure within the chamber 80 causes the bellows 82 to contract and increases the spacing between the capacitor plates 88 and 90, altering the electrical signal through the signals 94 and 96 in the opposite direction from the previous time. The altered signal is detected and amplified and fed to the pressure regulator 70 to decrease the pressure within the conduit 10a. In this manner, the soil moisture content is continuously monitored and maintained at a desired level by adjusting the pressure in the conduit 10a.

The variable resistor 76 represents any suitable means of calibrating the output from the amplifier to produce the desired pressure within the conduit 10a, and is used by the horticulturist to adjust the moisture content of the soil in much the same manner that a thermostat is used to adjust the automatically-maintained temperature of a room. Merely by way of example, suppose that the pressure regulator 70 has a diaphragm 70a which is connected to control a valve and is subjected to the pressure within the conduit 10a by a line 70b. Movement of the diaphragm 70a by the fluid pressure in the conduit 10a is opposed by a spring 70c and by the magnetic force of an electro-magnet 70d. Suppose, also, that the amplifier produces a direct gain to actuate the electro-magnet 70d to increase the force output of the electro-magnet and thereby increase the pressure in the conduit 10a by requiring a greater pressure acting against the diaphragm 70a to overcome the force of the spring 70c and the force of the electro-magnet 70d. The current flowing to the electro-magnet 70d is adjusted by the variable resistor 76. Therefore, a given soil moisture content will result in a given amplified power output from the amplifier which, at a given setting of the variable resistor 76, will result in a certain force exerted on the diaphragm by the electro-magnet, and a certain pressure will be required in the conduit 10a to act against the diaphragm 70a and close the regulator valve. If it is determined that the soil is being maintained too wet, the resistance of the variable resistor 76 is merely increased to decrease the force output of the electro-magnet and thereby reduce the regulated reference pressure in the conduit 10a. The reduced pressure results in lower flow rates from the conduit 10a at any and all soil moisture tensions and thereby decreases the average flow rate from the conduit 10a to the soil. If the soil is being maintained too dry, the resistance of the variable resistor 76 is decreased to increase the pressure in the conduit 10a and to increase the flow rate for a corresponding moisture content of the soil.

The sensing device of FIGURE 5 provides a means for automatically and continually adjusting the pressure in the conduit 10a which is directly responsive to the magnitude of the suction pressure of the soil, which is the factor that most directly affects the rate at which plants can take moisture from the soil. It is to be understood that any other sensing device can be used for continuously monitoring the moisture content of the soil. For example, the well-known resistance device indicated generally at 110 and illustrated in FIGURE 6, can be used in place of the suction pressure sensing device shown in FIGURE 5. The resistance device 110 is comprised of a porous ceramic block 112 having two electrodes 114 and 116 embedded therein. The ceramic block 112 is buried in the soil at a suitable sampling spot. The moisture in the soil then enters the pores of the block 112 by capillary action until the block is in moisture equilibrium with the soil. The moisture content of the block is in direct proportion to the moisture content of the soil at all times, readily increasing and decreasing as the soil moisture increases and decreases. The electrical resistance of the ceramic block 112 between the electrodes 114 and 116 is directly proportional to the moisture content of the block. The change in resistance of the block 112 can readily be used in the same manner as the change in spacing between the plates 88 and 90 of the device of FIGURE 5 to control the output from the amplifier 74 and adjust the pressure regulator 70 to increase and decrease the pressure in the conduit 10a in the desired manner.

It will be evident to a person skilled in the electronics arts that many other types of well-known electrical servo systems can readily be adapted to vary the pressure in the conduit 10a by adjustment of the pressure regulator 70 in response to the moisture content of the soil and in the manner described.

The apparatus described in FIGURES 4, 5 and 6 provides a means for accurately and continually controlling the moisture content of soil under many operating conditions. When using this pressure control apparatus, the resistance of the walls of the permeable elements 13 is not as critical and the elements 13 can therefore be manufactured more cheaply. The pervious distribution conduit may take the form of a continuous length of plastic tubing which has a high resistance to flow therethrough.

It is preferred that the permeable walls of the conduit 10a have a high resistance to flow of water therethrough. If the resistance to flow is high, the operating pressures within the conduit can be high. Then if the soil becomes too wet, the pressure may be decreased substantially to provide a substantial decrease in the flow rate to the soil. Then if the soil becomes too dry, the pressure may be increased substantially to increase the flow rate to the soil. Also, if the resistance is high, the conduit 10a may follow the contour of the soil and changes in elevation of several feet will not materially affect the distribution of water from the system because the variation in the pressure within the conduit due to difference in elevation will be small relative to the operating pressure within the conduit. Also, by employing high operating pressures, the pressure regulator 70 need not be constructed so as to provide precision control, and the accuracy required of the moisture sensing and electrical servo-mechanism is greatly reduced.

By way of example, if the high resistance pervious plastic tubing constituting the conduit 10a is installed at a six-inch depth below the surface of a contoured golf green and follows the contour of the greens and the surface of the golf green has a difference in elevation of ten feet, the pressure in the conduit 10a at the lower level will be approximately 5 p.s.i. greater than the pressure at the highest level. However, if the resistance to flow of the conduit 10a is designed so that an average operating pressure of 60 p.s.i. can be used in the conduit 10a, the flow rates from the conduit at the lower level will be less than eight percent more than the flow rates from the higher level at the average operating pressure. By placing the sensing element 72 at an average level, the variation from the "optimum" moisture content desired can be reduced even further.

From the above-detailed description, it will be obvious that a method for maintaining the moisture content of soil at any desired level is disclosed. The irrigation method has a wide range of applications in landscaping, agriculture, and building and highway construction, to name but a few. The accuracy with which a desired soil moisture content can be maintained varies only with the apparatus employed to utilize the method. Using the described method and apparatus, a horticulturist can select and continually maintain the best soil moisture condition for the particular results desired from a particular crop.

Apparatus has been described which may be economically manufactured and installed. The apparatus is easily operated to produce the desired results. It will be evident to those persons skilled in the art that various changes can be made in the disclosed device within the present invention. For example, a simple, manually adjustable pressure regulator may be substituted for the apparatus of FIGURE 2 for the control receptacle. However, the pressures normally employed will be on the order of six to eighteen inches of waterhead, and a few inches difference in water pressure may affect the soil moisture content to an appreciable extent. Manually adjustable pressure regulators with low operating pressures and the required accuracy may be expensive, while the device disclosed is most inexpensive and foolproof in operation. It will also be noted that in its broadest concept, the electrical servo-mechanism device for automatically adjusting the pressure of water in the conduit may employ mechanical, hydraulic or any other type of servo system. In many areas where the water supply contains impurities, the filter for extracting the physical impurities which might clog the pervious elements may be essential to economical operation.

Having thus described particular embodiments of my invention, it is to be understood that various changes can be made therein without departing from the spirit and scope of my invention as defined by the appended claims.

What is claimed is:

1. The subsurface irrigation system which comprises:
a conduit buried in the soil having water permeable walls with a high resistance to flow of water through the walls into the soil,
the resistance being such that for a given range of water pressures within the conduit the average rate of flow through the conduit walls as a result of the pressure differential across the conduit walls due to the internal pressure and the external soil pressure will be substantially equal to the average rate of moisture loss from the soil for a given range of moisture loss conditions, and water supply means for automaticaly continually maintaining a supply of water in the conduit at a preselectable constant pressure under changing flow rates through the walls of the conduit over an extended period of time during which variations in soil moisture conditions will normally occur to cause said change in flow rates.

2. The subsurface irrigation system defined in claim 1 wherein the supply means comprises a water container connected to supply water under pressure to the conduit such that the pressure in the conduit is essentially determined by the water level in the container, level control means for connecting the water container to a source of water under pressure and for maintaining a constant preselected water level in the water container relative to the conduit and thereby maintaining a constant preselected water pressure in the conduit, the level control means being adjustable to selectively vary the constant preselected water level in the water container to thereby selectively vary the constant water pressure in the conduit and thereby selectively establish a substantially constant average moisture content in the soil.

3. The subsurface irrigation system defined in claim 1 wherein the supply means comprises a water container connected to supply water under pressure to one end of the conduit, the pressure in the conduit adjacent said one end being determined by the water level in the container, and level control means for connecting the water container to a source of water under pressure and for maintaining a preselected water level in the container and therefore a preselected, constant pressure in the conduit, the height of the container being selectively variable to selectively change the pressure within the conduit and thereby selectively establish a substantially constant moisture condition in the soil.

4. The combination defined in claim 3 further characterized by an open-end standpipe connected to the other end of the conduit for indicating, by the level of water in the standpipe, the water pressure at said other end of the conduit whereby the water levels at each end of the conduit can be compared to facilitate adjustment of the pressure in the conduit.

5. The method of supplying moisture to a given volume of soil during a given irrigation period at an average rate substantially equal to the average rate at which moisture is lost from the soil during the period which comprises:

maintaining a supply of water in a conduit buried beneath the surface of the soil which has water permeable walls and a high resistance to flow of water through the walls of the conduit, the resistance to flow of water being sufficiently high that for a given range of water pressure within the conduit and for a given range of conditions effecting the loss of moisture from the soil the average rate of flow through the conduit walls will not exceed the average rate of moisture loss from the soil, continually, during the irrigation period, maintaining a preselected constant pressure in the conduit so long as the moisture content of the soil remains between selected minimum and maximum values, increasing the water pressure in the conduit when the moisture content of the soil decreases below a desired minimum to thereby increase the average rate of flow through the walls of the conduit, and decreasing the pressure in the conduit when the moisture content of the soil increases above a desired maximum thereby decreasing the rate of flow through the walls of the conduit whereby the moisture content of the soil may be continually maintained within a desired range.

References Cited

UNITED STATES PATENTS

| 1,604,189 | 10/1926 | Nelson. | |
|---|---|---|---|
| 2,052,020 | 8/1936 | Black | 61—13 |
| 2,309,233 | 1/1943 | Black | 61—13 |
| 2,445,717 | 7/1948 | Richards. | |
| 2,674,490 | 4/1954 | Richards. | |
| 2,817,956 | 12/1957 | Young | 61—13 |
| 3,024,372 | 3/1962 | Steele. | |
| 3,046,747 | 7/1962 | Timpe | 61—13 |

EARL J. WITMER, *Primary Examiner.*